May 11, 1937. W. S. CLOUD 2,080,113
METHOD AND APPARATUS FOR MAKING CONFECTIONS
Filed June 15, 1934
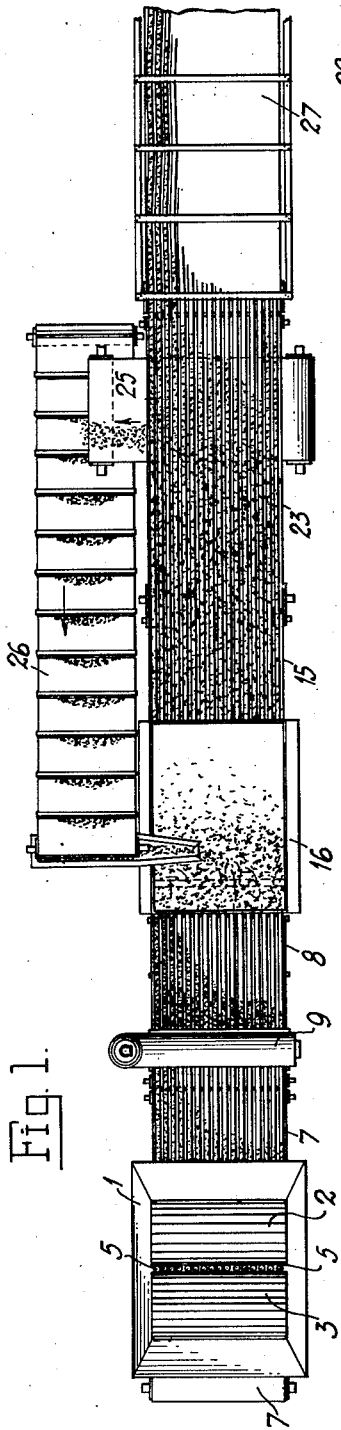
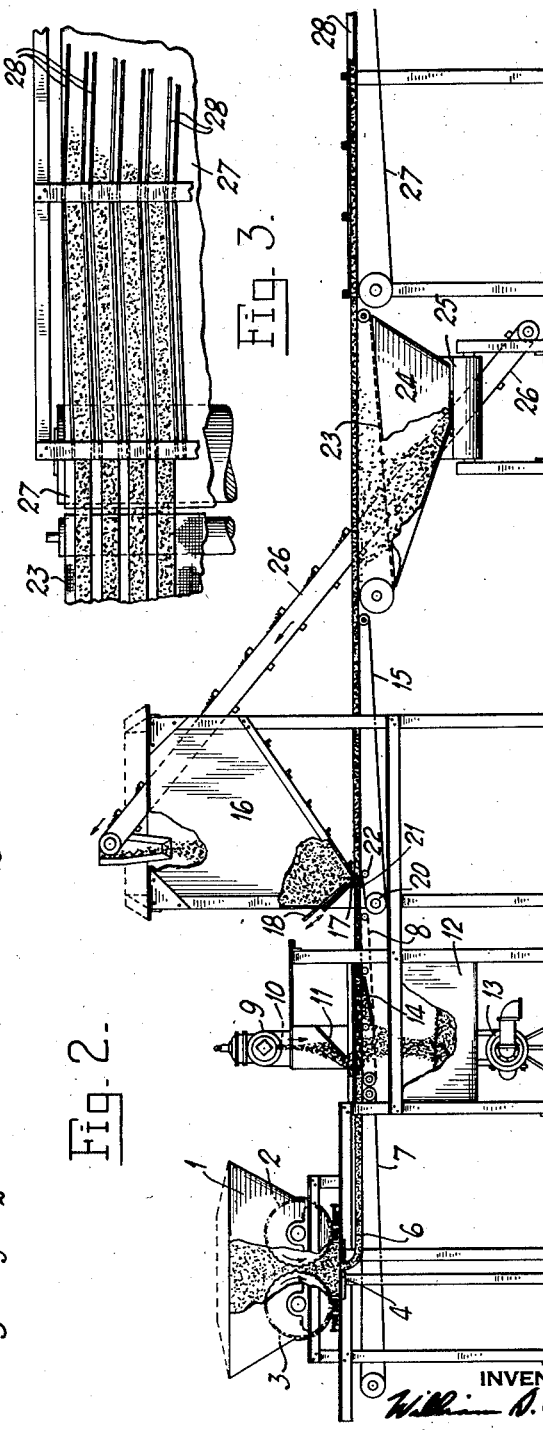
INVENTOR
William S. Cloud
BY
Emery, Booth, Varney, Whittemore
ATTORNEY Patented May 11, 1937

2,080,113

UNITED STATES PATENT OFFICE 2,080,113

METHOD AND APPARATUS FOR MAKING CONFECTIONS

William S. Cloud, Wilmette, Ill.

Application June 15, 1934, Serial No. 730,722

10 Claims. (Cl. 107—54)

This invention relates to the manufacture of confections, and pertains more particularly to the manufacture of so-called "rolls" of various types in which a center of suitable material such as fudge, for example, is coated with a layer of viscous material such as caramel or the like, then with a layer of small edible units such as nuts, raisins, cocoanut or the like which adheres to the viscous material, and optionally with a finishing coat of chocolate.

Originally, these "rolls" were made by hand-dipping methods, but subsequently I devised methods and apparatus for making the same by machine, and I obtained Letters Patent No. 1,462,883, dated July 24, 1923 (Reissue No. 16,712) and No. 1,608,302, dated November 23, 1926. In the methods and apparatus disclosed in these patents, I used, as my starting material, individual center pieces which had been previously formed, shaped and cut in the desired dimensions, and I handled these centers as units in the subsequent coating operations.

According to my present invention, I form a continuous rod or rods of the fudge or other material from which the centers are made, and I apply the viscous material and the edible units thereto before severing the rod or rods into individual units. Subsequently the said rods may be severed into individual units which may be coated with chocolate, if desired, in an ordinary enrobing machine.

A preferred embodiment of apparatus suitable for carrying out the invention is illustrated in the accompanying drawing, in which, Figure 1 is a top plan view, Figure 2 is a side elevation with parts broken away, and Figure 3 is an enlarged plan view of the rolling device.

The continuous rods of center material may be formed in any suitable manner, but in the apparatus illustrated, I have employed an extruder comprising a hopper 1 having two corrugated rollers 2 and 3 therein which are driven in any suitable manner. When rotated in the direction indicated, these rollers force the plastic center material through a die plate 4 having apertures 5 therein of the desired size and shape. The extruded rods 6 are picked up and carried by a conveyor 7, preferably of canvas or similar impervious material, the speed of the said conveyor being regulated to correspond to the speed at which the continuous rods 6 are extruded.

At the end of the conveyor 7 the continuous rods are picked up and carried by the conveyor 8 which is preferably of pervious material such as open mesh wire belting. The speed of the conveyor 8 is also regulated to correspond to the speed at which the rods are extruded.

Mounted in the vicinity of the conveyor 8 is a device known as an enrober comprising a cylinder 9 extending transversely across the conveyor 8, said cylinder being provided with a slot 10 extending lengthwise of the cylinder at the bottom thereof, through which a continuous flood of viscous coating material, such as caramel, for example, is distributed over the conveyor 8 and the continuous rods carried thereby. If desired, a guide plate 11 may be mounted beneath the cylinder to assist in the distribution of the flowing material. The excess material drops through the pervious conveyor and is collected in the tank 12 which may be heated if desired in order to maintain the viscous material at the proper temperature. Suitable pipe connections are provided between the bottom of the tank 12 and the cylinder 9 and a pump 13 is interposed in order that a continuous supply of viscous material may be pumped from the tank 12 to the cylinder 9. Preferably a plate 14 is located beneath the upper stretch of the conveyor 8, and is slightly inclined with respect thereto in order that a portion of the viscous material which drains through the conveyor may accumulate thereon so as to provide a coating for any portions of the under side of the rods 6 which may have escaped previous coating.

After leaving the conveyor 8 the rods are picked up and carried by the conveyor 15, preferably of impervious material such as canvas, and the speed of this conveyor is also adjusted to conform to the speed at which the rods are extruded. Mounted above the conveyor 15 is a hopper 16 containing the small edible units previously referred to, and an opening 17 is provided at the bottom of the hopper through which the said edible units are distributed over the viscous coated rods. Preferably a slide 18 is provided to control the opening 17, and a sufficient supply of edible units should be permitted to pass through the opening 17 to completely bury the viscous coated rods.

The roller 20 at the forward end of the conveyor 15 is depressed slightly so that the portion 21 of the upper stretch of the conveyor 15 between the roller 20 and the roller 22 is slightly inclined. It will also be observed that roller 22 is so located with respect to the opening 17 that this inclined portion 21 of the conveyor is slightly in advance of the opening 17. This permits some of the edible units to drop between adjacent rods onto the inclined portion of the conveyor and thus reach the under side of the rods so that the bottoms of the rods will be covered with edible units as well as the top and sides.

After leaving the end of the conveyor 15, the rods are picked up and carried by the conveyor 23, which is preferably a wire mesh conveyor having openings of sufficient size to permit the excess edible units which fail to stick to the rods to drop through the conveyor into the catch pan 24 from which they pass to the transverse conveyor 25 which carries them to the elevator 26 which returns them to the hopper 16.

After leaving the conveyor 23 the rods are picked up and carried by the conveyor 27, preferably of pervious material, such as wire mesh having openings of sufficient size to permit any loose edible units to drop through. Above the conveyor 27 are a plurality of guides 28 mounted edgewise with respect to the conveyor with their lower edges parallel to the conveyor and lying closely contiguous thereto. The said guides are arranged at an angle to the direction of travel of the conveyor so that the candy rods follow a sinuous path, thus causing the rod to be rotated or twisted slightly as it advances. In this manner the edible units on the top and sides of the rods are embedded in the viscous material, and the entire rod assumes a cylindrical shape.

The candy rods, after passing the enrober where the viscous coating is applied, are cooled during their continuous passage through the machine by exposure to the atmosphere, but if desired, suitable cooling apparatus may be provided to cool the rods more rapidly. For example, the conveyor 27 may be enclosed within a suitable cooling chamber, or blowers may be located in the neighborhood of the conveyor 27 to direct a current of cool air onto the moving rods.

After leaving the conveyor 27, the rods may be cut into individual pieces of suitable length, and these pieces may be packaged, or may be passed through an ordinary chocolate enrobing machine where an additional coating of chocolate may be applied in the usual manner.

It will be understood that the invention may be variously modified and embodied within the scope of the subjoined claims.

I claim as my invention:

1. Method of making confections, which comprises forming a continuous rod of center material, passing said rod continuously through a mass of viscous material, and passing said rod continuously through a mass of edible units, all of said operations being performed prior to severing said rod into individual units.

2. Method of making confections, which comprises forming a continuous rod of center material, passing said rod continuously through a continuously flowing curtain of viscous material, and passing said rod continuously through a continuous shower of edible units, all of said operations being performed prior to severing said rod into individual units.

3. Method of making confections, which comprises forming a continuous rod of center material, passing said rod continuously through a mass of viscous material, passing said rod continuously through a mas of edible units, and rolling said rod to embed said edible units in the viscous material, all of said operations being performed prior to severing said rod into individual units.

4. Method of making confections, which comprises forming a continuous rod of center material, passing said rod continuously through a continuously flowing curtain of viscous material, passing said rod continuously through a continuous shower of edible units, and rolling said rod to embed said edible units in the viscous material, all of said operations being performed prior to severing said rod into individual units.

5. Apparatus for making confections, comprising, in combination, means for forming a continuous rod of center material, means for conveying said rod in unbroken condition continuously, as formed, through a plurality of stations, means for coating said rod with viscous material, and means for covering the coated rod with edible units.

6. Apparatus for making confections, comprising, in combination, means for forming a continuous rod of center material, means for conveying said rod in unbroken condition continuously, as formed, through a plurality of stations, means for coating said rod with viscous material, means for covering the coated rod with edible units, and means for rolling said rod to embed said edible units in the viscous material.

7. Apparatus for making confections, comprising, in combination, means for forming a continuous rod of center material, means for conveying said rod in unbroken condition continuously, as formed, through a plurality of stations, means for coating said rod with viscous material, means for covering the coated rod with edible units, and means for spacing said conveying means from said rod in the vicinity of said covering means in order to permit said edible units to reach the bottom of said rod.

8. Apparatus for making confections, comprising, in combination, means for forming a continuous rod of center material, means for conveying said rod in unbroken condition continuously, as formed, through a plurality of stations, means for flooding said rod with viscous material so as to coat all sides thereof, and means for showering the coated rod with edible units.

9. Apparatus for making confections, comprising, in combination, means for forming a cont'nuous rod of center material, means for conveying said rod in unbroken condition continuously, as formed, through a plurality of stations, means for flooding said rod with viscous material so as to coat all sides thereof, means for showering the coated rod with edible units, and means spacing said conveying means from said rod in the vicinity of said showering means in order to permit said edible units to reach the bottom of said rod.

10. Apparatus for making confections, comprising, in combination, means for forming a continuous rod of center material, means for conveying said rod in unbroken condition continuously, as formed, through a plurality of stations, means for flooding said rod with viscous material so as to coat all sides thereof, means for showering the coated rod with edible units, means spacing said conveying means from said rod in the vicinity of said showering means in order to permit said edible units to reach the bottom of said rod, and means for rolling said rod to embed said edible units in the viscous material.

WILLIAM S. CLOUD.